L. GREEN.
Revolving Moldboard.
No. 31,712. 708,
Patented Mar. 19, 1861.
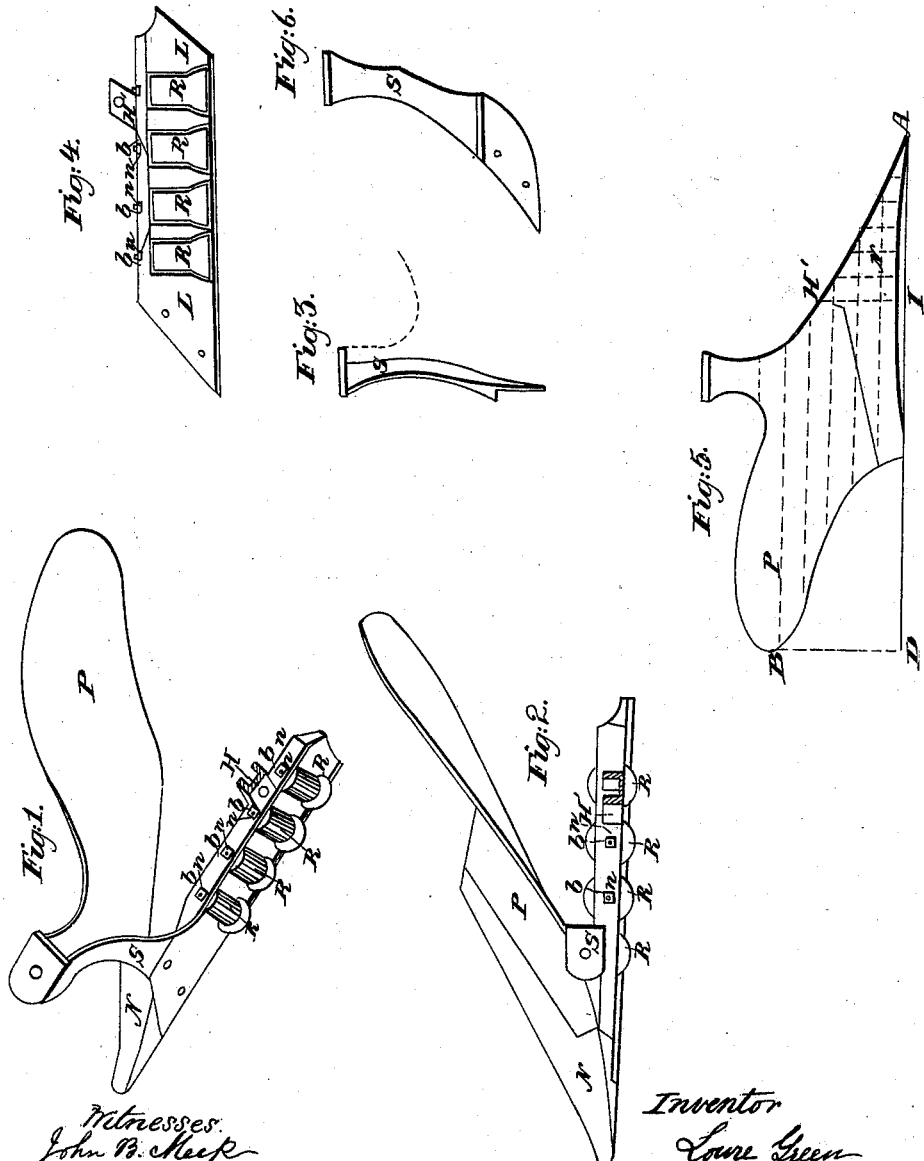

UNITED STATES PATENT OFFICE.

LOURE GREEN, OF GREAT BEND, PENNSYLVANIA.

IMPROVEMENT IN PLOWS.

Specification forming part of Letters Patent No. 31,712, dated March 19, 1861.

*To all whom it may concern:*

Be it known that I, LOURE GREEN, of Great Bend, in the county of Susquehanna, in the State of Pennsylvania, have invented certain new and useful Improvements in Plows; and I do hereby declare that the following is a full, clear, and exact description of the construction and operation of the same, reference being had to the annexed drawings, making a part of this specification, in which—

Figure 1 is a perspective view. Fig. 2 is a plan; Fig. 3, a separate view of the standard; Fig. 4, a separate view of the landside; Fig. 5, a view of the share and landside, showing the convex and concave portions of the face; and Fig. 6, a side view of the standard.

In Fig. 5 the face of the share is convex, in the direction of the perpendicular lines, from the point A to the line H I. From thence to the line B D the face of the mold-board and share is concave in the same direction. In the direction of the horizontal lines the faces of both share and mold-board are convex.

The standard S is curved or offset toward the upper end, as shown in the drawings. The object of this shape of the standard is to set the mold-board farther over, forming a quicker movement in turning the furrow at the front, and to cause a more gradual turn and truer curve at the neck, followed up throughout by the more edging position of the board, until the furrow is planted in its proper place. This changeable position of the mold-board, connected with the convex face in a horizontal direction, presents an entire unbroken furrow, even in the hardest and worst soils, and saves the most of the friction caused thereby against the landside and rear end of the board.

The offset of the upper end of the standard, when used to its greatest extent, is calculated to do away, in a great measure, with the side-hill plow, which will only be required on the steepest and roughest land. By this form of the standard the plow can be held squarely against the hill, instead of a perpendicular position, which must be the case in order to throw the mold-board farther over to turn the furrow, and if held in this perpendicular position the landside cannot preserve its uniform depth, but must cut deepest on the upper side, thereby subjecting the plow to be thrown out by every trifling obstacle in the ground, causing, also, the furrow to fall back broken and deranged.

In order to counteract the great amount of friction which occurs by pressure against the landside, I have constructed a friction-roller landside, as shown in Fig. 4, which also lightens the draft of the plow. L L is the landside, and R R R the friction-rollers. These rollers are placed in a vertical position, having flanges on the bottom, and secured to the landside by the bolts $b$ $b$ $b$, which pass entirely through and are held by the nuts or burrs $n$ $n$ $n$. These bolts are easily removed and new rollers substituted when desired. The left handle of the plow is to be connected at the top of the landside by a box-plate, as shown at H'. The lower brace behind can be of iron, held by nut and screw through the landside between the two back rollers, or through the bottom of the handle, as may be desired. This brace may be of wood, if preferred. These friction-rollers may be of various sizes and shapes, if their arrangement is substantially the same as shown, and may be attached in the most convenient manner.

Having thus shown the mode of construction and operation of my improved plow, what I claim as my invention, and desire to secure by Letters Patent, is—

The combination and arrangement of the share N, landside L, standard S, mold-board P, friction-rollers R R R, and box-plate H', the whole constructed as and for the purposes described.

LOURE GREEN.

Witnesses:
  WM. A. GREEN,
  J. C. GREEN.